(12) United States Patent
Turner et al.

(10) Patent No.: US 12,095,881 B1
(45) Date of Patent: Sep. 17, 2024

(54) VERSATILE INTEGRATION FRAMEWORK FOR SOFTWARE-AS-A-SERVICE (SAAS) FUNCTIONALITY

(71) Applicant: Avalara, Inc., Seattle, WA (US)

(72) Inventors: Mac Turner, Seattle, WA (US); Robert Erdman, Bremerton, WA (US); Stefan Kim, Maple Valley, WA (US); Angela Bartz, Kirkland, WA (US); Scott Seely, Galesville, WI (US)

(73) Assignee: Avalara, Inc., Seattle, WA (US)

( * ) Notice: Subject to any disclaimer, the term of this patent is extended or adjusted under 35 U.S.C. 154(b) by 183 days.

(21) Appl. No.: 17/749,751

(22) Filed: May 20, 2022

Related U.S. Application Data

(60) Provisional application No. 63/191,592, filed on May 21, 2021.

(51) Int. Cl.
*G06F 15/16* (2006.01)
*H04L 67/51* (2022.01)
*H04L 67/561* (2022.01)
*H04L 67/566* (2022.01)

(52) U.S. Cl.
CPC .......... *H04L 67/561* (2022.05); *H04L 67/51* (2022.05); *H04L 67/566* (2022.05)

(58) Field of Classification Search
CPC ...... H04L 67/561; H04L 67/51; H04L 67/566
See application file for complete search history.

(56) References Cited

U.S. PATENT DOCUMENTS

| | | |
|---|---|---|
| 7,783,536 B2 | 8/2010 | William et al. |
| 7,933,803 B1 | 4/2011 | Nadler et al. |
| 8,620,578 B1 | 12/2013 | Brown et al. |
| 8,725,407 B2 | 5/2014 | Hurley et al. |
| 9,760,915 B2 | 9/2017 | Pavlou et al. |
| 10,445,818 B1 | 10/2019 | Chowdhary |
| 10,769,611 B2 | 9/2020 | McNeel |
| 10,795,659 B1 * | 10/2020 | Kinsburskiy ............. G06F 8/65 |

(Continued)

OTHER PUBLICATIONS

Workato, "How It Works," 2022, retrieved on May 2, 2022, from https://www.workato.com/how_it_works, 6 pages.

(Continued)

*Primary Examiner* — Duyen M Doan
(74) *Attorney, Agent, or Firm* — Jeremiah J. Baunach; Frontier IP Law PLLC

(57) ABSTRACT

An online software platform (OSP) electronically receives a selection of a workflow framework of a plurality of workflow frameworks. Each workflow framework includes a configuration to embed software-as-a-service (SaaS) functionality provided by the OSP into an application that uses the SaaS functionality. The OSP electronically provides services for determining respective resources for individual relationship instances between different entities. In response to receiving the selection, the OSP causes a remote system that hosts the application to implement the selected workflow framework. This is performed by transmitting a software package to the remote system, in which the software package exposes a set of pre-defined integration points with the SaaS provided by the OSP to provision the steps in one or more of the workflows of the selected workflow framework or defines a specific set of requests and responses with the SaaS provided by the OSP.

8 Claims, 14 Drawing Sheets

(56) References Cited

U.S. PATENT DOCUMENTS

| | | |
|---|---|---|
| 11,330,070 B1* | 5/2022 | Nair ..................... H04L 67/561 |
| 2002/0138765 A1 | 9/2002 | Fishman et al. |
| 2007/0136158 A1 | 6/2007 | Rawlings et al. |
| 2007/0136159 A1 | 6/2007 | Rawlings et al. |
| 2009/0217310 A1* | 8/2009 | Koretz ..................... G06F 8/00 |
| | | 719/328 |
| 2013/0013471 A1 | 1/2013 | Fishman |
| 2015/0213365 A1* | 7/2015 | Ideses .................. G06F 21/567 |
| | | 706/12 |
| 2019/0042206 A1* | 2/2019 | Hulbert .............. H04L 61/5076 |

OTHER PUBLICATIONS

Workato, "Workflow Integration: What It Is and How To Implement It," 2022, retrieved on May 2, 2022, from https://workato.com/the-connector/workflow-integration/#:~:text=Workflow integration is the process, day-to-day work, 15 pages.

* cited by examiner

200

202 RECEIVE A SELECTION OF A WORKFLOW FRAMEWORK OF A PLURALITY OF WORKFLOW FRAMEWORKS, EACH WORKFLOW FRAMEWORK INCLUDING A CONFIGURATION TO EMBED SAAS FUNCTIONALITY INTO AN APPLICATION

204 CAUSE A REMOTE SYSTEM THAT HOSTS THE APPLICATION TO IMPLEMENT THE SELECTED WORKFLOW FRAMEWORK BY AT LEAST TRANSMITTING A SOFTWARE PACKAGE TO THE REMOTE SYSTEM THAT EXPOSES A SET OF PRE-DEFINED INTEGRATION POINTS WITH THE SAAS

212 SPECIFY AN ORDER IN WHICH TO CALL FUNCTIONS OF THE APPLICATION AND TO CALL THE SAAS FUNCTIONALITY

214 SPECIFY HOW DATA SHOULD FLOW BETWEEN STEPS IN ONE OR MORE WORKFLOWS

216 SPECIFY HOW ONE OR MORE WORKFLOWS SHOULD PROGRESS BASED ON RESULTS OF EACH STEP IN THE ONE OR MORE WORKFLOWS

220

222 DEFINE FIRST REQUEST FROM THE APPLICATION TO THE OSP FOR A NEW ACCOUNT WITH THE OSP, THE FIRST REQUEST INCLUDING USER INFORMATION

224 DEFINE FIRST RESPONSE TO THE FIRST REQUEST, THE FIRST RESPONSE INCLUDING ACCOUNT IDENTIFICATION AND A LICENSE KEY

226 DEFINE SECOND REQUEST FROM THE APPLICATION TO THE OSP, THE SECOND REQUEST INCLUDING INFORMATION INDICATING AN ENTITY ASSOCIATED WITH THE USER DETERMINED TO BE AUTHENTICATED BY APPLICATION

228 DEFINE SECOND RESPONSE FROM THE OSP TO THE SECOND REQUEST, THE SECOND RESPONSE INCLUDING INFORMATION INDICATING AN AUTHENTICATED ENTITY CODE VALUE TO BE STORED BY THE APPLICATION

230 DEFINE THIRD REQUEST FROM THE APPLICATION, THE THIRD REQUEST BEING A REQUEST FOR AN INDICATION OF WHETHER THE PARTICULAR ENTITY ASSOCIATED WITH THE USER HAS A NEXUS WITH A PARTICULAR DOMAIN SELECTED BY THE USER

232 DEFINE THIRD RESPONSE FROM THE OSP TO THE THIRD REQUEST, THE THIRD RESPONSE INCLUDING AN INDICATION OF WHETHER THE PARTICULAR ENTITY ASSOCIATED WITH THE USER ALREADY HAS A NEXUS THAT EXISTS WITH THE PARTICULAR DOMAIN SELECTED BY THE USER

234 DEFINE FOURTH REQUEST FROM THE APPLICATION, THE FOURTH REQUEST BEING A REQUEST FOR A NEXUS MODEL FOR THE APPLICATION TO STORE AND APPLY TO THE PARTICULAR ENTITY GOING FORWARD TO DETERMINE WHETHER THE PARTICULAR ENTITY ASSOCIATED WITH THE USER HAS A NEXUS WITH THE PARTICULAR DOMAIN SELECTED BY THE USER

FIG. 2C

VERSATILE INTEGRATION FRAMEWORK FOR SOFTWARE-AS-A-SERVICE (SAAS) FUNCTIONALITY

TECHNICAL FIELD

The technical field relates to computer networks and software integration, and particularly to a versatile integration framework for SaaS functionality over computer networks.

BRIEF SUMMARY

Using a variety of techniques as described herein, alone or in combination, an online software platform (OSP) electronically receives a selection of a workflow framework of a plurality of workflow frameworks. The plurality of workflow frameworks may comprise a catalog of workflow frameworks provided by the OSP from which an integration partner selects the workflow framework that best fits or is most applicable to the needs of the integration partner. In some embodiments, the catalog of workflow frameworks may include those which the OSP has previously built or provided for other integrations partners. Each workflow framework includes a configuration to embed software-as-a-service (SaaS) functionality provided by the OSP into an application that uses the SaaS functionality. In an example embodiment, the OSP electronically provides services for determining respective resources for individual relationship instances between different entities. In response to receiving the selection, the OSP causes a remote system that hosts the application to implement the selected workflow framework. This is performed by transmitting a software package to the remote system, in which the software package exposes a set of pre-defined integration points with the SaaS provided by the OSP to provision the steps in one or more of the workflows of the selected workflow framework or defines a specific set of requests and responses with the SaaS provided by the OSP that the application implements in order to begin the one or more workflows in the selected workflow framework and respond to application steps in the one or more workflows.

The system and methods described herein may also, in a client system of the OSP, electronically transmit a request for a workflow framework of a plurality of workflow frameworks provided by the OSP remote from the client system. Each workflow framework includes a configuration to embed SaaS functionality provided by the OSP into an application at the client system. The embedded SaaS functionality accesses services provided by the OSP for determining respective resources for individual relationship instances between different entities. The client system, in response to transmitting the request for the selected workflow framework, receives a software package. The software package exposes a set of pre-defined integration points with the SaaS provided by the OSP to provision the steps in one or more of the workflows of the selected workflow framework or defines a specific set of requests and responses with the SaaS provided by the OSP that the application implements in order to begin one or more of the workflows in the selected workflow framework and respond to application steps in the one or more workflows.

The systems and methods described herein for a versatile integration framework for SaaS functionality over computer networks provide faster processing of software integrations requests and faster integration development, and thus improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks and existing computerized systems to facilitate availability and efficiency of computing resources to perform SaaS integration into partner applications.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 2A is a flowchart illustrating a sample method for integrating SaaS functionality over computer networks according to embodiments of the present disclosure, which is an improvement in automated computerized systems.

FIG. 2C is a flowchart illustrating a sample method for integrating SaaS functionality over computer networks involving defining particular requests and responses between an OSP and an application to implement the integration according to embodiments of the present disclosure, which is an improvement in automated computerized systems

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
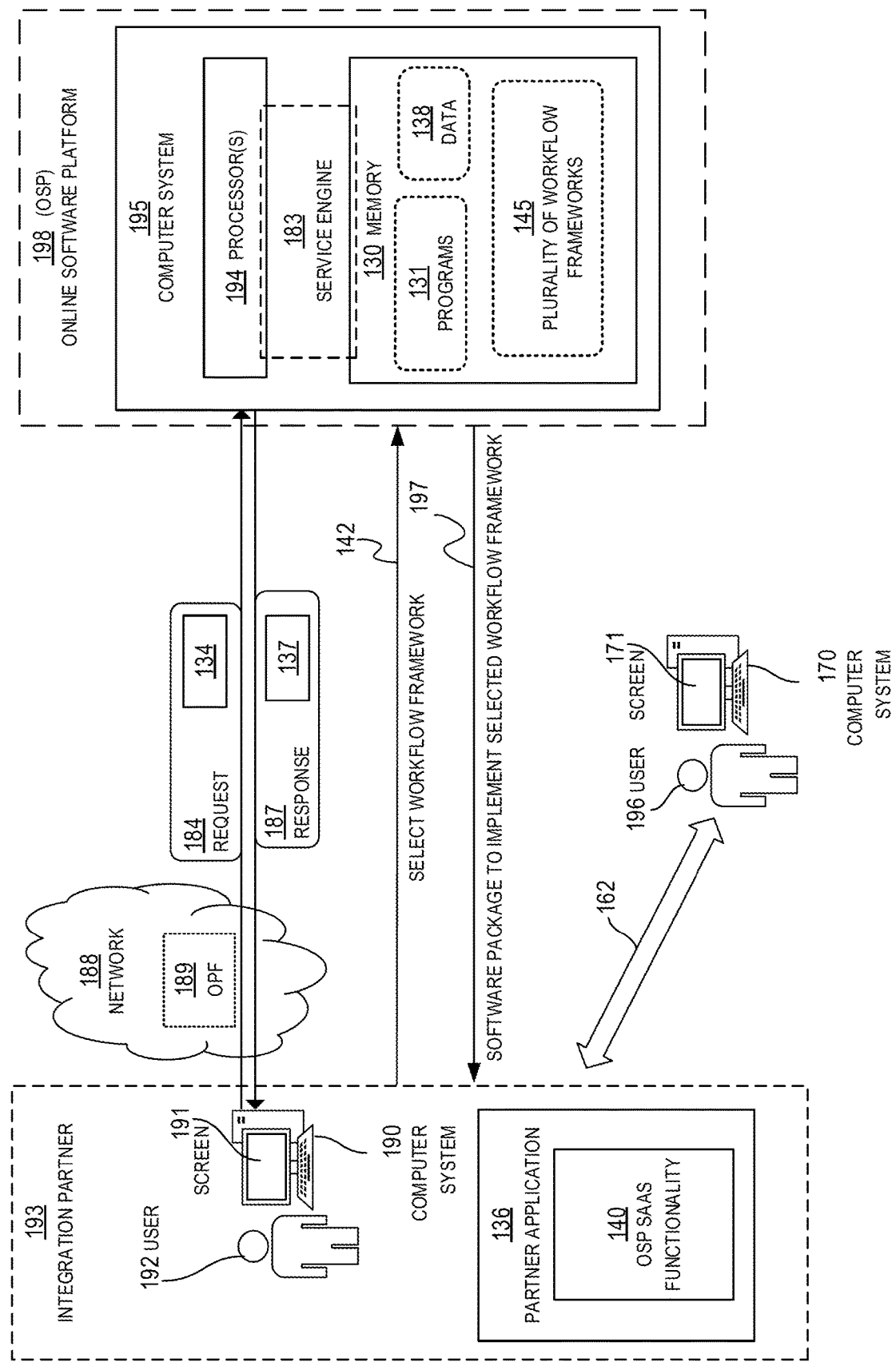
FIG. 1 is a diagram showing sample aspects of embodiments of the present disclosure that are improvements in automated computerized systems.

FIG. 1 is a diagram showing sample aspects of embodiments of the present disclosure that are improvements in automated computerized systems. The OSP 198 electronically provides, via the service engine 183, services for determining respective resources for individual relationship instances between different entities. In particular, in an example embodiment, an OSP 198 determines, via the service engine 183, a resource based on applying digital rules to a dataset of a client, such as integration partner 193 and/or user 196. The OSP 198 may use data received via communication network 188 from a variety of sources, such as, for example, user 196, integration partner 193, and other entities and systems to produce a resource. The resource can be, or be a part of, a computational result, a document, a determination, an item of value, a representation of an item of value, etc., made, created or prepared for the integration partner 193, the user 196, etc., on the basis of one or more attributes of dataset. As such, in some embodiments, the resource is produced by a determination and/or a computation performed by the service engine 183.

In an example embodiment, the OSP 198 electronically receives a selection of a workflow framework 142 of a plurality of workflow frameworks 145 generated, stored and/or accessible by the OSP 198. The plurality of workflow frameworks may comprise a catalog of workflow frameworks provided by the OSP from which an integration partner selects the workflow framework that best fits or is most applicable to the needs of the integration partner. In some embodiments, the catalog of workflow frameworks may include those which the OSP 198 has previously built or provided for other integrations partners. The OSP 198 may manage and update the catalog by continuing to expand the workflow frameworks, make modifications, or delete from it. In some embodiments, the OSP 198 may provide and manage a set of standard workflow frameworks which an integration partner may select from as starting points for their own workflow framework. By adopting a pre-configured or standard workflow framework, the integration partner 163 can be quickly onboarded and access the OSP 198 products and services, faster and with less effort. Each workflow framework includes a configuration to embed SaaS functionality 140 provided by the OSP 198 into a partner application 136 that uses the SaaS functionality 140. In response to receiving the selection, the OSP 198 causes a remote system that hosts the partner application 136, such as computer system 190, to implement the selected workflow framework by at least transmitting a software package 197 to the computer system 190 that is used to implement the selected workflow framework within the partner application 136.

In an example embodiment, the software package exposes a set of pre-defined integration points (e.g., application programming interface (API) integration points) with the SaaS provided by the OSP 198 to provision the steps in one or more of the workflows of the selected workflow framework or defines a specific set of requests and responses with the SaaS provided by the OSP 198 that the partner application 136 implements in order to begin one or more workflows in the selected workflow framework and respond to application steps in the workflows. Once the OSP SaaS functionality 140 is thus integrated and embedded in the partner application 136, an external user 196 may then use the partner application via various user interfaces (UIs) of the partner application 136 displayed on screen 171 to access the SaaS functionality provided by the OSP 198. In some embodiments, the partner application 136 may be accessed remotely by a user without embedding on a local device, for example, via a portal on a web browser (not shown).

A sample computer system 195 of the OSP 198 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an OSP 198. The OSP 198 can be configured to perform one or more predefined services, for example, via operations of the service engine 183. Such services may be completely software-based and designed as cloud-native, meaning that they're agnostic to the underlying cloud infrastructure, allowing higher deployment, agility and flexibility. Embodiments, described herein may use containerization to implement such services, or functionality thereof, as microservices. Containerization is the packaging of software code with just the operating system (OS) libraries and dependencies required to run the code to create a single lightweight executable (a container) that runs consistently on any infrastructure. Software platforms, such as Kubernetes, manage containerized workloads and automate the deployment, scaling, and management of containerized applications. Compared to virtual machines (VMs) containers have relaxed isolation properties to share the Operating System (OS) among the applications. Therefore, containers are considered lightweight. A container has its own file system, share of CPU, memory and process space. As containers are decoupled from the underlying infrastructure, they are portable across clouds and OS distributions.

Such services can be searches, determinations, computations, verifications, notifications, database services, the transmission of specialized information, including data that effectuates payments or remits resources, the generation and transmission of documents, the online accessing other systems to effect registrations, the generating and operating of graphical user interfaces (GUIs) and so on, including what is described in this document. Such services can be provided as SaaS.

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of user 192, which can be referred to also merely as entity. In such instances, the user 192 can be an agent of the entity, such as integration partner 193, and even within a physical site of the integration partner 193, although that is not necessary. In embodiments, the computer system 190 or other device of the user 192 or the entity 193 are client devices for the computer system 195.

Similarly, the user 196 may use a computer system 170 that has a screen 171, on which UIs may be displayed. Additional sample implementation details for the computer system 171 also are given later in this document. In embodiments, user 196 and the computer system 171 are considered part of user 196, which can be referred to also merely as an entity. In such instances, the user 196 can be an agent of the entity, and even within a physical site of the entity, although that is not necessary. In embodiments, the computer system 170 or other device of the user 196 are client devices for the computer system 190.

The computer system 190 may access the computer system 195 via a communication network 188, such as the Internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM") systems, frame relay systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), a private or public wireless cellular network (e.g., a fifth generation (5G) wireless network) or the Internet.

Downloading or uploading may be permitted from one of these two computer systems to the other, and so on. Such accessing can be performed, for instance, with manually uploading files, like spreadsheet files, software packages, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application, such as partner application 136, and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital rules to the payload 134 to determine a requested resource, form a payload 137 that is an aspect of the resource, and then push, send, or otherwise cause to be transmitted a response 187 that carries the payload 137 to the connector. The connector reads the response 187, and forwards the payload 137 to the certain application, such as partner application 136.

In an alternative such architecture, a device remote to the service engine 183, such as computer system 190, may have a particular application, such as partner application 136. In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the user 192 or user 196 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource, and sends an aspect of it back to the REST API. In turn, the REST API sends the response 187 that has the payload 137 to the particular application, such as partner application 136.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190, computer system 170 and any devices of the OPF 189 can be considered to be remote devices, at least from the perspective of the computer system 195.

Such interactions and methods of communication and described herein between the OSP 198, the user 192, and user 196 such as those regarding and/or involving APIs, Request 184, Response 187, network 188 and OPF 189 may also be applied to and used in or used for interactions and methods of communication between the OSP 198 and other entities, devices and/or systems shown in FIG. 1, including, but not limited to other users and third parties.

In some instances, the user 192 or the user 196 may have instances of relationships with other entities. Only one such integration partner 193 is shown. However, additional entities may be present in various other embodiments. Also, for example, the communication or interaction 162 between the user 196 and the integration partner 193 may be made over network 188.

In some instances, the user 192, integration partner 193 and/or the user 196 may have data about one or more other entities, for example via relationship instances of the user 196 with other entities. Also, the integration partner 193 may have data about the user 196, for example via relationship instances of the user 192 or user 196 with other entities. The user 196, user 192 and/or the integration partner 193 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 195 receives one or more datasets. The dataset may be received by the computer system 195 in a number of ways. In some embodiments, one or more requests may be received by the computer system 195 via network 188. In this example, a request 184 is received by the computer system 195 via the network 188. The request 184 has been transmitted by the remote computer system 190. The received one or more requests can carry payloads. In this example, the request 184 carries a payload 134. In such embodiments, the one or more payloads may be parsed by the computer system 195 to extract the dataset. In this example, the payload 134 can be parsed by the computer system 195 to extract the dataset. In this example, the single payload 134 encodes the entire dataset, but that is not required. In fact, a dataset can be received from the payloads of multiple requests. In such cases, a single payload may encode only a portion of the dataset. And, of course, the payload of a single request may encode multiple datasets. Additional computers may be involved with the network 188, some beyond the control of the user 192 or OSP 198, and some within such control. In embodiments, stored digital rules may be accessed by the computer system 195 to apply to the datasets to produce a resource as part of the services provided by the OSP 198 to the integration partner application 136.

FIG. 2A is a flowchart illustrating a sample method 200 for integrating SaaS functionality over computer networks according to embodiments of the present disclosure, which is an improvement in automated computerized systems.

At 202, the OSP 198 electronically receives a selection of a workflow framework of a plurality of workflow frameworks. Each workflow framework includes a configuration to embed SaaS functionality provided by the OSP 198 into an application that uses the SaaS functionality. The OSP 198 electronically provides services for determining respective resources for individual relationship instances between different entities. In some embodiments, the OSP 198 may also generate the plurality of workflow frameworks.

At 204, the OSP 198, in response to receiving the selection, causes a remote system that hosts the application to implement the selected workflow framework by at least transmitting a software package to the remote system. The software package may expose a set of pre-defined integration points with the SaaS provided by the OSP 198 to provision the steps in one or more of the workflows of the selected workflow framework The software package may also or instead define a specific set of requests and responses with the SaaS provided by the OSP 198 that the application implements in order to begin the one or more workflows in the selected workflow framework and respond to application steps in the one or more workflows.

The software package may include a script and/or an executable binary file which, when executed by the remote system, automates integration and embedding of the SaaS functionality provided by the OSP 198 into the application using the set of pre-defined integration points with the SaaS or the specific set of requests and responses with the SaaS provided by the OSP 198. In an another example embodiment, the software package includes an application plug-in which, when installed in the application, automates integration and embedding of the SaaS functionality provided by the OSP 198 into the application using the set of pre-defined integration points with the SaaS or the specific set of requests and responses with the SaaS provided by the OSP 198.

The software package, when implemented by the remote system, automates integration and embedding of the SaaS functionality provided by the OSP into the application. For example, this may be accomplished by implementation of the software package causing the remote system to perform initial configuration to capture authentication and authorization credentials, location of related services, and activation of features of the SaaS functionality provided by the OSP 198. Implementation of the software package may also cause the remote system to perform runtime behavior for core embedding and integration into the application of the SaaS functionality provided by the OSP 198 for determining respective resources for individual relationship instances between different entities. In some embodiments, implementation of the software package may also cause the remote system to perform uninstall behavior for an application user to remove the embedding and integration into the application of the SaaS functionality provided by the OSP 198.

Figure 2B:
FIG. 2B is a flowchart illustrating a sample method for integrating SaaS functionality over computer networks involving specifying particular operations to implement the integration according to embodiments of the present disclosure, which is an improvement in automated computerized systems.
Figure 2B:

FIG. 2B is a flowchart illustrating a sample method 210 for integrating SaaS functionality over computer networks involving specifying particular operations to implement the integration according to embodiments of the present disclosure, which is an improvement in automated computerized systems. Method 210 may be useful in the method 200 of FIG. 2A as described below.

At 212, one or more workflows specifies an order in which to call functions of the application and to call the SaaS functionality provided by the OSP 198 for determining respective resources for individual relationship instances between different entities.

At 214, the one or more workflows specifies how data should flow between steps in the one or more workflows.

At 216, the one or more workflows specifies how the one or more workflows should progress based on results of each step in the one or more workflows.

FIG. 2C is a flowchart illustrating a sample method 220 for integrating SaaS functionality over computer networks involving defining particular requests and responses between the OSP 198 and an application to implement the integration according to embodiments of the present disclosure, which is an improvement in automated computerized systems. Method 220 may be useful in the method 200 of FIG. 2A as described below. In particular, the application may be provided by an integration partner of the OSP 198. A specific workflow of the selected workflow framework defines a specific set of requests and responses in a particular sequence with the SaaS, such as the sequence below.

At 222, the selected workflow framework defines or causes a first request from the application to the OSP for a new account with the OSP in which the first request includes user information.

At 224, the selected workflow framework defines or causes a first response to the first request in which the first response includes account identification and a license key.

At 226, the selected workflow framework defines or causes a second request from the application to the OSP. The second request includes information indicating an entity associated with the user determined to be authenticated by application.

At 228, the selected workflow framework defines or causes a second response from the OSP to the second request. The second response includes information indicating an authenticated entity code value to be stored by the application.

At 230, the selected workflow framework defines or causes, after the second response from the OSP to the second request, a third request from the application to be sent. The third request is a request for an indication of whether the particular entity associated with the user has a nexus with a particular domain selected by the user used for purposes of determining respective resources for individual relationship instances between the particular entity and different entities.

At 232, the selected workflow framework defines or causes a third response from the OSP to the third request. The third response includes an indication of whether the particular entity associated with the user already has a nexus that exists with the particular domain selected by the user.

At 234, the selected workflow framework defines or causes a fourth request from the application. The fourth request is a request for a nexus model for the application to store and apply to the particular entity going forward to determine whether the particular entity associated with the user has a nexus with the particular domain selected by the user.

Figure 3A:
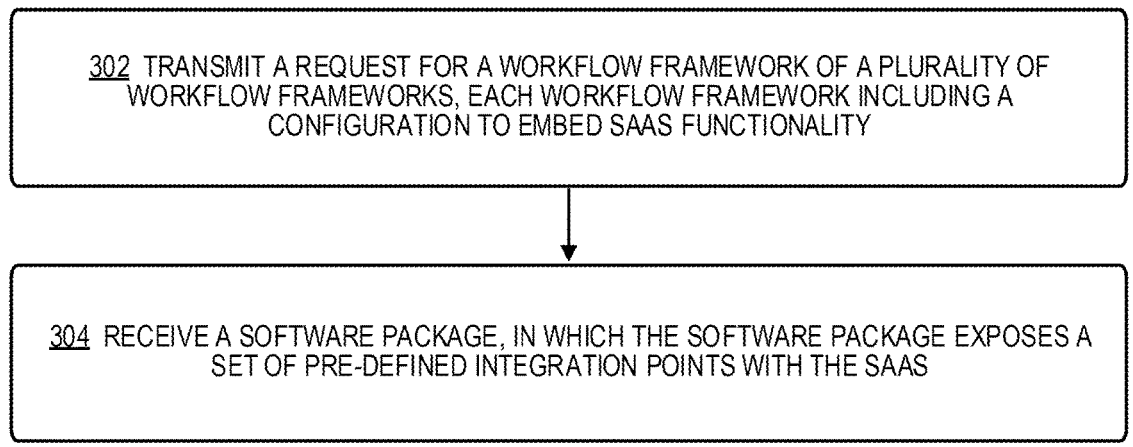
FIG. 3A is a flowchart illustrating a sample method in a client system for integrating SaaS functionality over computer networks according to embodiments of the present disclosure, which is an improvement in automated computerized systems.

FIG. 3A is a flowchart illustrating a sample method 300 in a client system, such as computer system 190 of integration partner 193, for integrating SaaS functionality over computer networks according to embodiments of the present disclosure, which is an improvement in automated computerized systems.

At 302, the computer system 190 electronically transmits a request for a workflow framework of a plurality of workflow frameworks provided by an OSP remote from the client system, each workflow framework including a configuration to embed SaaS functionality provided by the OSP into an application at the client system. The embedded SaaS functionality accesses services provided by the OSP for determining respective resources for individual relationship instances between different entities.

At 304, the computer system 190, in response to transmitting the request for the selected workflow framework, receives a software package. The software package exposes a set of pre-defined integration points with the SaaS provided by the OSP to provision the steps in one or more of the workflows of the selected workflow framework or defines a specific set of requests and responses with the SaaS provided by the OSP that the application implements in order to begin one or more of the workflows in the selected workflow framework and respond to application steps in the workflows.

Figure 3B:
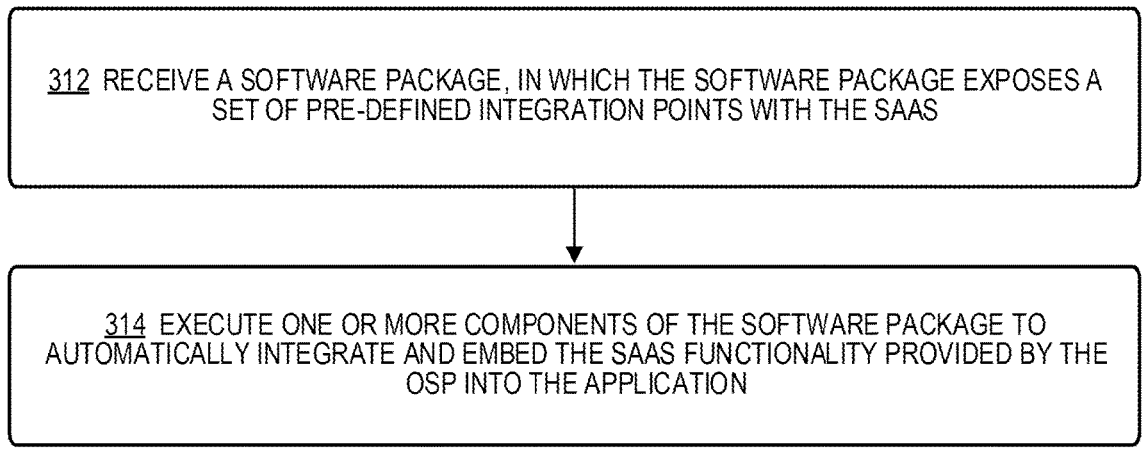
FIG. 3B is a flowchart illustrating a sample method in a client system for automating integration of SaaS functionality over computer networks according to embodiments of the present disclosure, which is an improvement in automated computerized systems

FIG. 3B is a flowchart illustrating a sample method 310 in a client system for automating integration of SaaS functionality over computer networks according to embodiments of the present disclosure, which is an improvement in automated computerized systems.

At 312, the computer system 190 receives the software package referenced in method 300.

At 314, the computer system 190 executes one or more components of the software package to automatically integrate and embed the SaaS functionality provided by the OSP into the application using the set of pre-defined integration points with the SaaS or the specific set of requests and responses with the SaaS provided by the OSP. The computer system 190 may then perform the steps in the one or more workflows of the selected workflow framework. In an example embodiment, the computer system 190 performs (or causes to be performed) the specific set of requests and responses with the SaaS provided by the OSP. For example, the computer system 190 may initiate or perform the requests of method 220 and thus cause the responses of method 220 to be received.

Figure 3C:
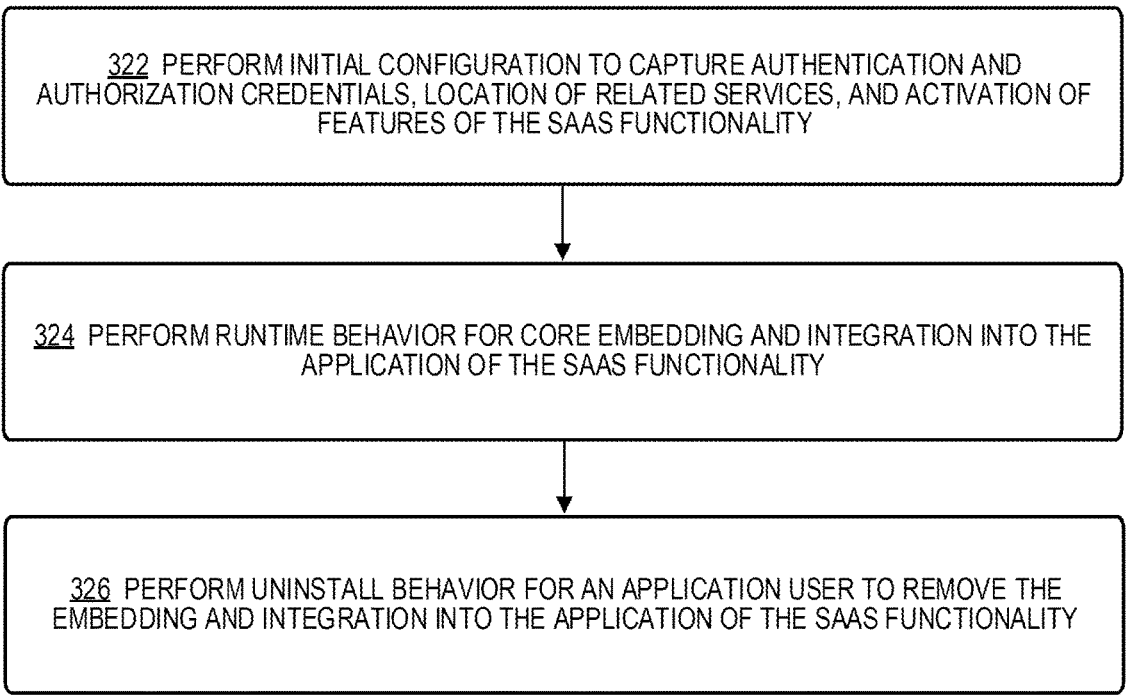
FIG. 3C is a flowchart illustrating a sample method in a client system for integration of SaaS functionality over computer networks including more detailed operations to implement the integration according to embodiments of the present disclosure, which is an improvement in automated computerized systems.

FIG. 3C is a flowchart illustrating a sample method 320 in a client system for integration of SaaS functionality over computer networks including more detailed operations to implement the integration according to embodiments of the present disclosure, which is an improvement in automated computerized systems.

At 322, the computer system 190 performs initial configuration to capture authentication and authorization credentials, location of related services, and activation of features of the SaaS functionality provided by the OSP.

At 324, the computer system 190, based on the software package received in method 300, performs runtime behavior for core embedding and integration into the application of the SaaS functionality provided by the OSP for determining respective resources for individual relationship instances between different entities.

At 324, the computer system 190 performs uninstall behavior for an application user to remove the embedding and integration into the application of the SaaS functionality provided by the OSP.

Figure 4:
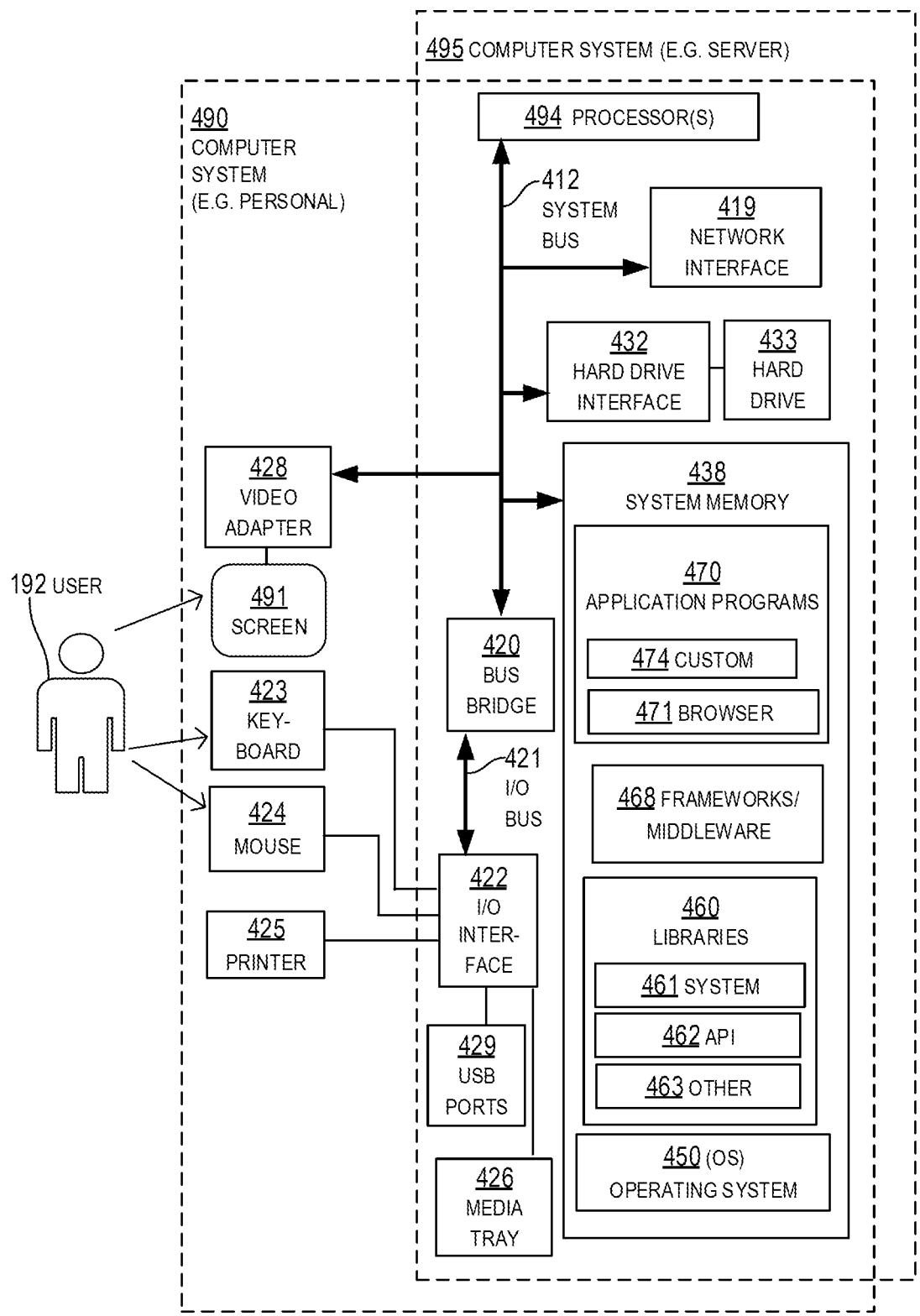
FIG. 4 is a block diagram showing additional components of sample computer systems according to embodiments of the present disclosure, which is an improvement in automated computerized systems.

FIG. 4 is a block diagram showing additional components of sample computer systems according to embodiments of the present disclosure, which is an improvement in automated computerized systems. FIG. 4 shows details for a sample computer system 495 and for a sample computer system 490. The computer system 495 may be a server, while the computer system 490 may be a personal device, such as a personal computer, a desktop computer, a personal computing device such as a laptop computer, a tablet computer, a mobile phone, and so on. Either type may be used for the computer system 195, 193 or 190 of FIG. 1, a computer system that is part of OPF 189, a computer system that hosts a virtual machine or provides a cloud computing environment that implements any of the functionality described herein, and/or a computer system that is part of any entity or system shown in any of the Figures, or referenced, in the present disclosure.

The computer system 495 and the computer system 490 have similarities, which FIG. 4 exploits for purposes of economy in this document. It will be understood, however, that a component in the computer system 495 may be implemented differently than the same component in the computer system 490. For instance, a memory in a server may be larger than a memory in a personal computer, and so on. Similarly, custom application programs 474 that implement embodiments may be different, and so on.

The computer system 495 includes one or more processors 494. The processor(s) 494 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 494 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific specialized machines, or specific specialized components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), API endpoints, containers, clusters, nodes, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., computer code embodied on a machine-readable medium) or hardware components. The hardware components depicted in the computer system 495, or the computer system 490, are not intended to be exhaustive. Rather, they are representative, for highlighting important components that can be used with embodiments.

The computer system 495 also includes a system bus 412 that is coupled to the processor(s) 494. The system bus 412 can be used by the processor(s) 494 to control and/or communicate with other components of the computer system 495.

The computer system 495 additionally includes a network interface 419 that is coupled to system bus 412. Network interface 419 can be used to access a communications network, such as the network 188. Network interface 419 can be implemented by a hardware network interface, such as a Network Interface Card (NIC), Ethernet communication components, wireless communication components, cellular communication components, Near Field Communication (NFC) components, Bluetooth® components such as Bluetooth® Low Energy, Wi-Fi® components, etc. Of course, such a hardware network interface may have its own software, and so on.

The computer system 495 also includes various memory components. These memory components include memory components shown separately in the computer system 495, plus cache memory within the processor(s) 494. Accordingly, these memory components are examples of non-transitory machine-readable media. The memory components shown separately in the computer system 495 are variously coupled, directly or indirectly, with the processor(s) 494. The coupling in this example is via the system bus 412.

Instructions for performing any of the methods or functions described in this document may be stored, completely or partially, within the memory components of the computer system 495, etc. Therefore, one or more of these non-transitory computer-readable media can be configured to store instructions which, when executed by one or more processors 494 of a host computer system such as the computer system 495 or the computer system 490, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 495 include a non-volatile hard drive 433. The computer system 495 further includes a hard drive interface 432 that is coupled to the hard drive 433 and to the system bus 412.

The memory components of the computer system 495 include a system memory 438. The system memory 438 includes volatile memory including, but not limited to, cache memory, registers and buffers. In embodiments, data from the hard drive 433 populates registers of the volatile memory of the system memory 438.

In some embodiments, the system memory 438 has a software architecture that uses a stack of layers, with each layer providing a particular functionality. In this example the layers include, starting from the bottom, an Operating System (OS) 450, libraries 460, frameworks/middleware 468 and application programs 470, which are also known as applications 470. Other software architectures may include less, more or different layers. For example, a presentation layer may also be included. For another example, some mobile or special purpose operating systems may not provide a frameworks/middleware 468.

The OS 450 may manage hardware resources and provide common services. The libraries 460 provide a common infrastructure that is used by the applications 470 and/or other components and/or layers. The libraries 460 provide functionality that allows other software components to perform tasks more easily than if they interfaced directly with the specific underlying functionality of the OS 450. The libraries 460 may include system libraries 461, such as a C standard library. The system libraries 461 may provide functions such as memory allocation functions, string manipulation functions, mathematical functions, and the like.

In addition, the libraries 460 may include API libraries 462 and other libraries 463. The API libraries 462 may include media libraries, such as libraries to support presentation and manipulation of various media formats such as MPEG4, H.264, MP3, AAC, AMR, JPG, and PNG. The API libraries 462 may also include graphics libraries, for instance an OpenGL framework that may be used to render 2D and 3D in a graphic content on the screen 491. The API libraries 462 may further include database libraries, for instance SQLite, which may support various relational database functions. The API libraries 462 may additionally include web libraries, for instance WebKit, which may support web browsing functionality, and also libraries for applications 470, such as REST or RESTful APIs.

The frameworks/middleware 468 may provide a higher-level common infrastructure that may be used by the applications 470 and/or other software components/modules. For example, the frameworks/middleware 468 may provide various Graphic User Interface (GUI) functions, high-level resource management, high-level location services, and so forth. The frameworks/middleware 468 may provide a broad spectrum of other APIs that may be used by the applications 470 and/or other software components/modules, some of which may be specific to the OS 450 or to a platform.

The application programs 470 are also known more simply as applications and apps. One such app is a browser 471, which is a software that can permit the user 192 to access other devices in the internet, for example while using a Graphic User Interface (GUI). The browser 471 includes program modules and instructions that enable the computer system 495 to exchange network messages with a network, for example using Hypertext Transfer Protocol (HTTP) messaging.

The application programs 470 may include one or more custom applications 474, made according to embodiments disclosed herein. These can be made so as to cause their host computer to perform operations according to embodiments disclosed herein. Of course, when implemented by software, operations according to embodiments disclosed herein may be implemented much faster than may be implemented by a human mind if they can be implemented in the human mind at all; for example, tens, hundreds or millions of such operations may be performed per second according to embodiments, which is much faster than a human mind can do. Such speed of operations, and thus the use of such computing systems and networks, are integral to the embodiments described herein because such operations would be practically useless unless they are able to be applied to hundreds or thousands of computer network clients simultaneously or concurrently across computer networks and to the vast volumes of data that change in real-time provided by such computer network clients. Implementing a practical application of the embodiments described herein to hundreds or thousands of computer network clients simultaneously or concurrently across computer networks on which they operate and to the vast volumes of data that change in real-time provided by such computer network clients is impossible to do in the human mind and is not organizing human activity.

Other such applications 470 may include a contacts application, a word processing application, a location application, a media application, a messaging application, and so on. Applications 470 may be developed using the ANDROID™ or IOS™ Software Development Kit (SDK) by an entity other than the vendor of the particular platform, and may be mobile software running on a mobile operating system such as IOS™, ANDROID™, or other mobile operating and/or portable computing systems. The applications 470 may use built-in functions of the OS 450, of the libraries 460, and of the frameworks/middleware 468 to create user interfaces for the user 192 to interact with.

The computer system 495 moreover includes a bus bridge 420 coupled to the system bus 412. The computer system 495 furthermore includes an input/output (I/O) bus 421 coupled to the bus bridge 420. The computer system 495 also includes an I/O interface 422 coupled to the I/O bus 421.

For being accessed, the computer system 495 also includes one or more Universal Serial Bus (USB) ports 429. These can be coupled to the I/O interface 422. The computer system 495 further includes a media tray 426, which may include storage devices such as CD-ROM drives, multimedia interfaces, and so on.

The computer system 490 may include many components similar to those of the computer system 495, as seen in FIG. 4. In addition, a number of the application programs may be more suitable for the computer system 490 than for the computer system 495.

The computer system 490 further includes peripheral input/output (I/O) devices for being accessed by a user more routinely. As such, the computer system 490 includes a screen 491 and a video adapter 428 to drive and/or support the screen 491. The video adapter 428 is coupled to the system bus 412.

The computer system 490 also includes a keyboard 423, a mouse 424, and a printer 425. In this example, the keyboard 423, the mouse 424, and the printer 425 are directly coupled to the I/O interface 422. Sometimes this coupling is wireless or may be via the USB ports 429.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 494.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein.

Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

The above-mentioned embodiments have one or more uses. Aspects presented below may be implemented as was described above for similar aspects. (Some, but not all, of these aspects have even similar reference numerals.)

Figure 5:
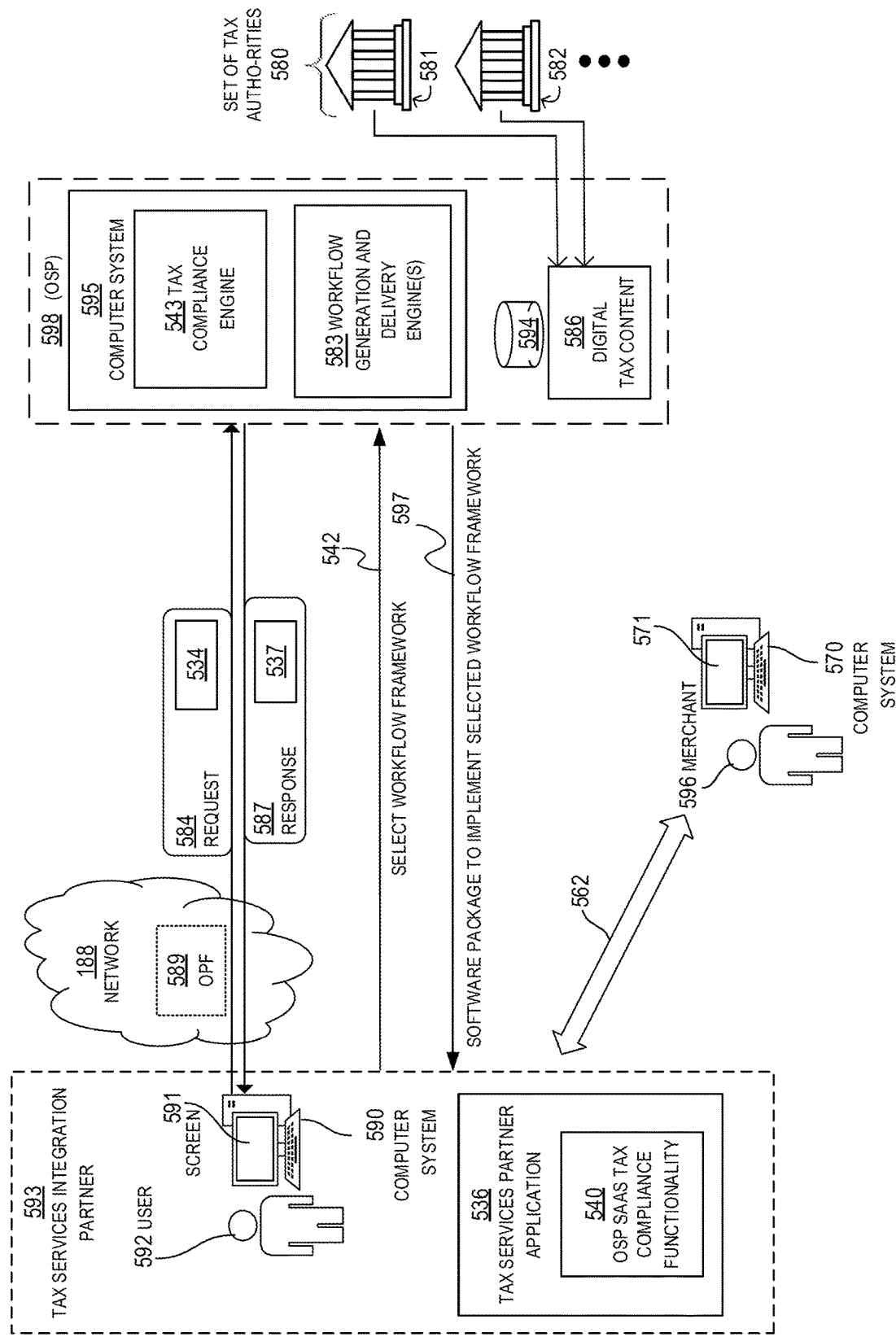
FIG. 5 is a diagram of sample aspects for describing operational examples and use cases of embodiments of the present disclosure, which is an improvement in automated computerized systems.

FIG. 5 is a diagram of sample aspects for describing operational examples and use cases of embodiments of the present disclosure, which is an improvement in automated computerized systems. As an example use case, the integration partner 193 of FIG. 1 may be a tax services integration partner 593 for a plurality of merchants of goods and/or services, such as merchant 596, who use the electronic tax compliance services of the OSP 598 as SaaS via the tax services partner application 536. Such services may be to calculate a tax obligation, such as sales tax, on transactions of the merchant 596 in real-time as the transactions occur, determine sales tax compliance, determine tax nexus of the merchant 596 in various tax jurisdictions, determine tax exemptions for various transactions, and optionally for electronic preparation and sending of an associated tax return document for one or more transactions.

In an example embodiment, the tax services integration partner 593 may be or provide an online service that enables companies, such as merchant 596, to manage all key business processes in a single system, including the tax compliance services of the OSP 598 as SaaS via the tax services partner application 536. The OSP 598 offers standalone API endpoints for consumption by the tax services partner application 536 of the tax services integration partner 593. The present disclosure provides methods of linking data flows between these API endpoints to achieve a desired outcome or objective in the technological field of computerized indirect tax compliance for hundreds or thousands of clients concurrently or simultaneously. In some embodiments, the tax services partner application 536 may be a smart phone or other mobile device application.

In an example embodiment the OSP 598 provides an explicit API workflow, included a software package that is executable by the tax services integration partner 593 to automate embedding and integration of the workflow in the tax services partner application 536, represented by embedded OSP SaaS tax compliance functionality 540. The explicit API workflow included the software package is to build tax compliance integration of SaaS functionality of the OSP 598 instead of the user 592 having to manually determine how, when and where to integrate individual components for a successful and robust integration that works in the most efficient manner with the APIs of the OSP 598. Traditionally, there has not existed an explicit certifiable API workflow to build a tax compliance integration versus a "choose your adventure model". Partners and customers, such as tax service integration partner 593 and merchant 596, may be provided with "bumpers" or outlines to stay within. However, without technological solutions provided herein including explicit electronic guidance on what to build and how to build such integration and an automated integration solution based on such guidance that actually builds the integration according to such guidance, tax services integration partners may seek explicit guidance through manual one on-one engagements with resources of the OSP 598. This delays the partners' technological development work and creates single points of failure within the OSP 598. The technological integration solutions disclosed herein solves both of these technological problems through publishing explicit, on-demand electronic integration guidance on what to build and how to build such integration of SaaS tax compliance functionality, as well as by providing an automated integration solution based on such guidance that actually builds the integration according to such guidance. Also, the explicit API workflows and software packages including such workflows in the applicable framework may be certifiable or certified by the OSP 598 or other certification entity (e.g., tax authorities 580) to be compliant and interoperable with OSP APIs and/or compliant or interoperable with other applicable technological systems, services and APIs.

Various practical advantages include, but are not limited to: increased ease in white-labeling of SaaS tax compliance functionality provided by OSP 598 (white-labeling is the technological ability to present such functionality to end users, such as via user interfaces of the tax services partner application 536, as coming directly from or provided directly by the tax services integration partner 593); improved velocity of integration development; improved likelihood of tax compliance system certification; reduced reliance on solution consultation (OSP technical support); improved existing API documentation; improved partner satisfaction (via robust on-demand documentation); improved customer satisfaction (via faster integration development and enhancement releases). Such improvements in faster processing of software integrations requests and faster integration development thus improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

Unique integration components are provided by OSP 598, for example, for how to embed, and that may automatically embed, tax nexus determinations, tax exemption determinations and implementation, and/or other items' functionality into another application, such as tax services partner application 536, via extensibility points including, but not limited to: integration points for tax services partner application 536 (e.g., for APIs, application configuration files and UI, webhooks, etc.), external integrations for tax services partner application 536 (e.g., for external databases, file systems, application servers, etc.), and other such mechanisms.

The tax services integration partner 593 may also select which workflow framework 542 that meets their individual tax service needs from a plurality of workflow frameworks. For example, such selectable workflow frameworks may include, but are not limited to: workflow frameworks for real-time sales tax calculation and compliance; workflow frameworks for sales tax nexus determinations for one or more particular tax jurisdictions; workflow frameworks for tax exemption determination services; workflow frameworks for electronic preparation and sending of an associated tax return documents to applicable tax authorities 580; workflow frameworks for historical transaction and tax data analysis, past, current and future tax risk assessments; workflow frameworks for tax recommendations, etc. The explicit API workflows and software package including such workflows to implement the selected workflow framework may be generated and delivered by the workflow generation and delivery engine(s) 583 in response to the received selection of the workflow framework.

A computer system 595 is shown, which is used to help customers, such as merchant 562, with tax compliance via the tax services partner application 536 of tax services integration partner 593. Further in this example, the computer system 595 is part of an OSP 598 that is implemented as a SaaS provider, for being accessed by merchant 562, via the tax services partner application 536 of tax services integration partner 593. Alternately, the functionality of the computer system 595 may be provided locally to a user.

A user 592 may be standalone. The user 592 may use a computer system 590 that has a screen 591, on which UIs may be shown. In embodiments, the user 592 and the computer system 590 are considered part of user 592, which can be referred to also merely as entity. In such instances, the user 592 can be an agent of the entity, such as tax services integration partner 593, and even within a physical site of the tax services integration partner 593, although that is not necessary. In embodiments, the computer system 590, or other devices of the user 592 or the entity 593, are client devices for the computer system 595.

The merchant 596 may use a computer system 570 that has a screen 571, on which UIs as disclosed herein may be displayed. In embodiments, the merchant 596 and the computer system 571 are considered part of merchant 596, which can be referred to also merely as entity. In such instances, the merchant 596 can be an agent of the entity, and even within a physical site of the entity, although that is not necessary. In embodiments, the computer system 570 or other device of the merchant 596 are client devices for the computer system 590 and communicate with computer system 590 via electronic communication link 562, which may be part of or utilize network 188.

In a number of instances, the user 592, the tax services integration partner 593 and/or the merchant 596 use software applications to manage their business activities, such as sales, resource management, production, inventory management, delivery, billing, and so on. The user 592, the tax services integration partner 593 and/or the merchant 596 may further use accounting applications to manage purchase orders, reservations, bookings, sales invoices, refunds, payroll, accounts payable, accounts receivable, and so on. Such software applications, and more, may be used locally by the user 592, the tax services integration partner 593 and/or the merchant 596, or from an Online Processing Facility (OPF) 589 that has been engaged for this purpose by the user 592, the tax services integration partner 593 and/or the merchant 596. In such use cases, the OPF 589 can be a Mobile Payments system, a Point of Sale (POS) system, an accounting application, an Enterprise Resource Planning (ERP) system or provider, an e-commerce provider, an electronic marketplace, a Customer Relationship Management (CRM) system, and so on. In some embodiments, the OPF 589 may be, or be used by, the user 592, the tax services integration partner 593 and/or the merchant 596.

Businesses have tax obligations to various tax authorities of respective tax jurisdictions. A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority offers a temporary tax holiday, during which certain taxes are waived.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's tax agency, b) set up internal processes for collecting sales tax in accordance with the sales tax rules of the tax authority, c) maintain records of the sales transactions and of the collected sales tax in the event of a subsequent audit by the taxi agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical challenge for businesses is that the above-mentioned software applications generally cannot provide tax information that is accurate enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities—if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e., non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is and/or or what the products or services being sold are. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

Even where a merchant or seller might not have reached any of the thresholds for economic nexus, a number of states are promulgating marketplace facilitator laws that sometimes use such thresholds. According to such laws, intermediaries that are characterized as marketplace facilitators per laws of the state have an obligation, instead of the seller, to collect sales tax on behalf of their sellers, and remit it to the state. The situation becomes even more complex when a seller sells directly to a state, and also via such an intermediary.

To help with such complex determinations and solve such technical problems, the computer system 595 may be specialized device for tax compliance as disclosed herein. The computer system 595 may have one or more processors and memory, for example, as was described for the computer system 195 of FIG. 1. The computer system 595 thus implements a system for a versatile integration framework for SaaS tax compliance functionality over computer networks for tax services integration partners, as disclosed herein.

The computer system 595 may further store locally entity data, such as in database 594, which may include data of the user 592, the tax services integration partner 593 and/or the merchant 596, any of which/whom may be a customer, and/or a seller or a buyer in a sales transaction in various embodiments. The entity data may include profile data of the merchant and transaction data from which a determination of a tax obligation is desired. In the online implementation of FIG. 5, the OSP 598 has a database 594 for storing the entity data. This entity data may be inputted by the user 592, and/or caused to be downloaded or uploaded by the user 592 from the computer system 590, from the merchant 596 or from the OPF 589, or extracted from the computer system 590 or from computer system 570 or from the OPF 589, and so on. In other implementations, a simpler memory configuration may suffice for storing the entity data.

A digital tax content 586 is further implemented within the OSP 598. The digital tax content 586 can be a utility that stores digital tax rules for use by the tax compliance engine 543 and workflow generation and delivery engine(s) 583. As part of managing the digital tax content 586, there may be continuous updates of the digital tax rules, by inputs gleaned from a set 580 of different tax authorities 581, 582, and so on. Updating may be performed by humans, or by computers, and so on. The number of the different tax authorities in the set 580 may be very large.

For a specific determination of a tax obligation, exemption status and/or available tax exemptions, the computer system 595 may receive one or more datasets. A sample received dataset which can be similar to what was described for the dataset of FIG. 1. In this example, the computer system 590 transmits a request 584 that includes a payload 534, and the dataset 535 is received by the computer system 595 parsing the received payload 534. In this example the single payload 534 encodes the entire dataset 535, but that is not required, as mentioned earlier. In the resent example, the dataset has been received via the tax services partner application 536 because it is desired to determine any tax obligations arising from a buy-sell transaction involving the merchant 596. As such, the sample received dataset has values that characterize attributes of the buy-sell transaction. In this example, the consequent of applying a digital tax rule to the dataset may specify that a tax is due based on the sale price, a specific rate, a tax exemption, specify an OSP account creation verification, specify the tax return form that needs to be prepared and filed, a date by which it needs to be filed, and so on.

In an example embodiment, the computer system 595 causes notification to be transmitted via response 587, which is then presented to the merchant 596 via a UI of the tax services partner application 536 using embedded OSP SaaS tax compliance functionality 540. In the example of FIG. 5, the notification is caused to be transmitted by the computer system 595 as an answer to a request 584, which may include a received dataset. Prior to the tax services integration partner 593 providing such tax compliance services, such request 584 may include the selection of the workflow framework 542 (e.g., as payload 534) and such response 587 may include the software package (e.g., as payload 537) including the selected workflow framework used by the tax services integration partner 593 to embed and integrate such tax compliance services into the tax services partner application 536 as OSP SaaS tax compliance functionality 540. Subsequent requests and responses, including a subsequent request 584 and response 587, may be the result of implementation of the selected workflow framework embedded and integrated into the tax services partner application 536 as OSP SaaS tax compliance functionality 540 and use of the embedded OSP SaaS tax compliance functionality 540.

Figure 6:
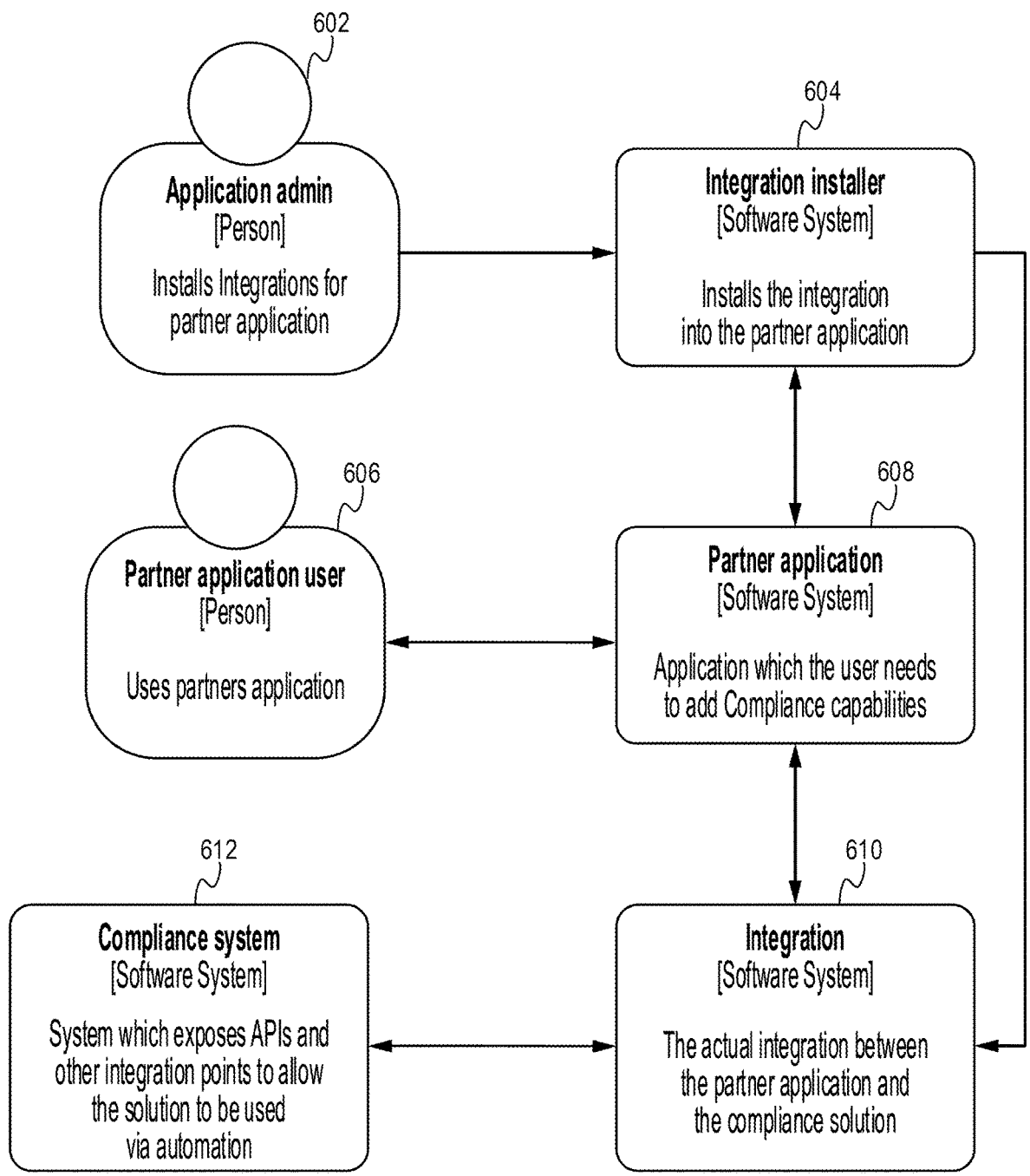
FIG. 6 is a diagram illustrating operations and interactions between different system components in a use case involving a tax compliance system according to various embodiments of the present disclosure, which is an improvement in automated computerized systems.

FIG. 6 is a diagram illustrating operations and interactions between different system components in a use case involving a tax compliance system according to various embodiments of the present disclosure, which is an improvement in automated computerized systems.

Referring also to FIG. 5, the versatile integration framework for SaaS functionality over computer networks disclosed herein comprises API endpoints of OSP 598 (including requests/responses) ordered and structured in a way that results in an integration component, such as the embedded OSP SaaS functionality for the tax services partner application 536 of FIG. 5. These integration components can be as core as sales tax calculation, or as specialized as account provisioning of an account with the OSP 598 for individual merchants, such as merchant 596. This versatile integration framework for SaaS functionality provides, via a software package for a selected workflow framework, an electronically provided guide for endpoints to call, the order in which the endpoints are called, and the data stored and chained throughout the endpoints for respective integration components.

The guide may take several forms. For example, the guide may comprise automated integration, which may take the form of a script, an application plug-in, or a binary included in a software package which automates the integration. Regardless of form, in an example embodiment, the process may have three stages including: initial configuration to capture things like authentication and authorization credentials, location of related services, and activation of features; runtime behavior for the core integration need in the compliance piece; and uninstall behavior for when the application owner wishes to remove the integration. As another example, the guide may comprise a workflow which specifies the order in which to call the application and the tax compliance related functions. This may include specifying how data should flow between steps in the workflow, and how the workflow should progress based on the results of each step in the workflow. This piece may include documentation on how to store configuration information, such as, but not limited to, authentication credentials and file directory locations. This may also include user created or configuration mandated names for the configuration properties. As yet another example, the guide may comprise computer code provided by the OSP 598 which the consumer edits in specific places to provide information specific to their configuration such as authentication information and file locations.

For example, as shown in FIG. 6, the application administrator 602 of the tax services partner application 536 (e.g., user 592 of FIG. 5), configures and installs the integration component, such as the selected workflow framework of FIG. 5 included in a software package received by the tax services integration partner 593 of FIG. 5. The integration installer 604 then installs the integration into the application, such as the tax services partner application 536. For example, the integration installer 604 may also be part of the software package received by the tax services integration partner 593 of FIG. 5. The integration installer 604 places the applicable workflows of the selected workflow framework into the correct integration points of the applicable OSP APIs using data gathered by the application administrator 602, resulting in the integration 610 (e.g., the embedded OSP SaaS functionality for the tax services partner application 536 of FIG. 5). The partner application user 606, such as merchant 596 of FIG. 5, uses partner application 608 and the applicable integration as designed by the received workflows in the selected workflow framework. Such use causes and depends on exchanges of data between the partner application 608 and the integration 610 and also between the integration 610 and the compliance system 612. The compliance system 612 (e.g., tax compliance engine 543 of FIG. 5) exposes APIs and other integration points to allow the technological solution to be used via automation, according to or otherwise based on instructions in the workflow(s) of the selected workflow framework.

Figure 7:
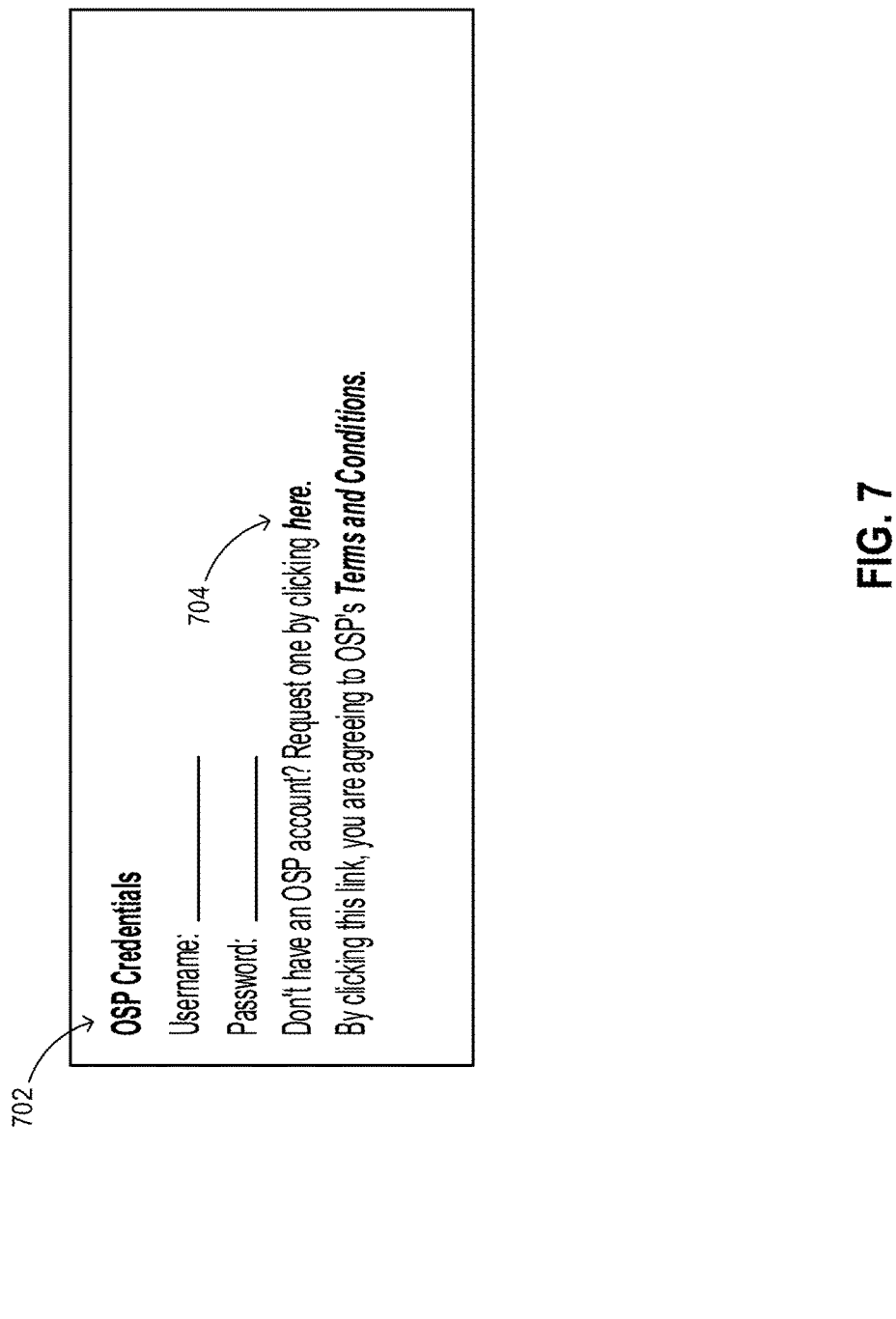
FIG. 7 is a diagram illustrating an example user interface (UI) for a merchant to open an account with an OSP provided by an application of an integration partner of the OSP that has SaaS functionality of a tax data and analysis compliance engine of the OSP embedded and integrated in the application according to various embodiments of the present disclosure, which is an improvement in automated computerized systems.

FIG. 7 is a diagram illustrating an example UI 700 for a merchant, such as merchant 596 of FIG. 5, to open an account with OSP 598, provided by the tax services partner application 536 that has OSP SaaS tax compliance functionality 540 of the tax compliance engine 543 embedded and integrated in the tax services partner application 536 of FIG. 5 according to various embodiments of the present disclosure, which is an improvement in automated computerized systems. As shown, displayed is an interactive UI element for the merchant 596 to enter OSP credentials to log in to an account of the OSP 598 if one exists for the merchant 596 and a selectable UI element 704 the merchant 596 may select to initiate an account creation and provisioning process if no account currently exists according to the workflow used by embedded OSP SaaS tax compliance functionality 540 of FIG. 5.

Figure 8:
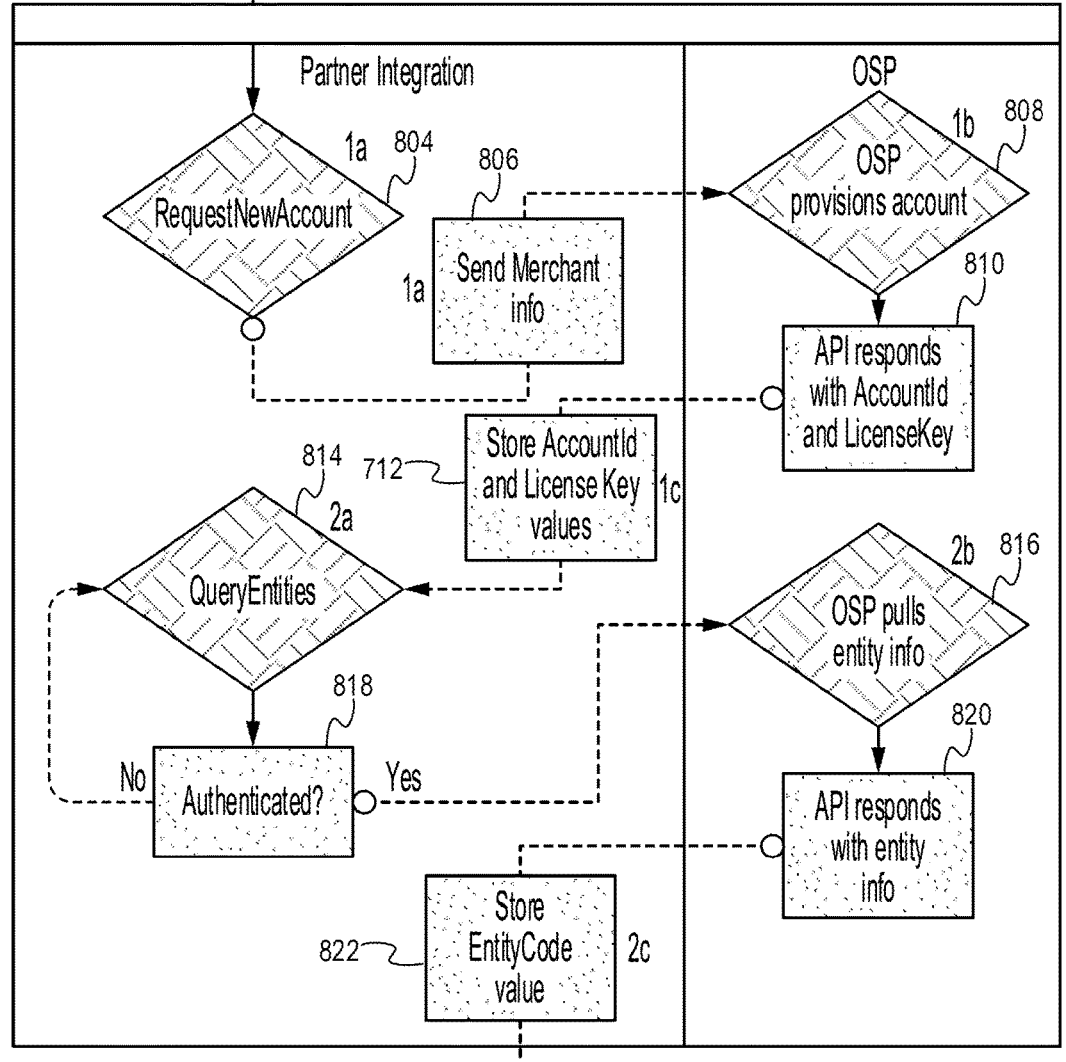
FIG. 8 is a diagram illustrating an example application programming interface (API) workflow associated with a selected API framework for provisioning of a merchant's account with the OSP as a result of a selection via the UI of FIG. 7 and that defines a specific set of requests and responses with the SaaS provided by the OSP that the application of the integration partner implements to provide electronic tax compliance services according to various embodiments of the present disclosure, which is an improvement in automated computerized systems.

FIG. 8 is a diagram illustrating an example API workflow 800 associated with a selected API framework for provisioning of a merchant's account with the OSP as a result of a selection of the selectable UI element 704 of the UI 700 of FIG. 7 and that defines a specific set of requests and responses with the SaaS provided by the OSP 598 that the tax services partner application 536 of the tax services integration partner 593 implements to provide electronic tax compliance services according to various embodiments of the present disclosure, which is an improvement in automated computerized systems.

At starting point 802, and referring also to FIG. 5, the merchant 596 requests an account via the selection of the selectable UI element 804 of the UI 700. The embedded OSP SaaS tax compliance functionality 540 then performs action 804 to request a new account which activates API body element 806 to send applicable merchant information to the OSP 598. The OSP 598 then performs action 808 to generate and provision a new account for the merchant 596 which activates API body element 810 to respond with a new account identifier (ID) and license key to API body element 812 of the embedded OSP SaaS tax compliance functionality 540. API body element 812 then locally stores the received account ID at the client system of the tax services partner application 536. The embedded OSP SaaS tax compliance functionality 540 then performs action 814 to query entities associated with the merchant 596 and/or tax services integration partner 593 to determine whether they are authenticated by the tax services partner application 536 and communicate such authenticated entity information to API body element 818. API body element 818 then forwards a request with such authenticated entity information to the OSP 598, causing the OSP 598 to perform action 816 to pull the applicable entity information and send it to API body element 820 of the OSP 598. API body element 820 then responds to API body element 822 of the embedded OSP SaaS tax compliance functionality 540 with the applicable entity information indicating an authenticated entity code value. The authenticated entity code value is then stored by API body element 822, causing the OSP account to be successfully provisioned and configured at point 824 for merchant 596. API endpoint bodies and request/response chains may be utilized to embed, configure and integrate the OSP SaaS tax compliance functionality (e.g., SaaS tax compliance functionality 540 of FIG. 5) in the tax services partner application (e.g., tax services partner application 536 of FIG. 5).

Figure 9:
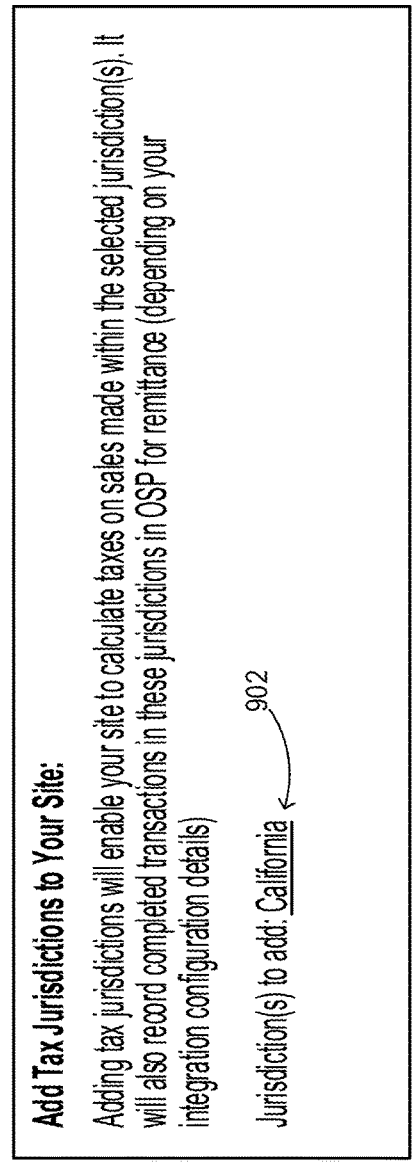
FIG. 9 is a diagram illustrating an example UI for a merchant to select determination of nexus in various domains, and is provided by an application of an integration partner of an OSP that has SaaS functionality of a tax data and analysis compliance engine of the OSP embedded and integrated in the application, according to various embodiments of the present disclosure, which is an improvement in automated computerized systems.

FIG. 9 is a diagram illustrating an example UI 900 for a merchant, such as merchant 596 of FIG. 5, to select determination of tax nexus in one or more selected tax jurisdictions, and is provided by the tax services partner application 536 that has OSP SaaS tax compliance functionality 540 of the tax compliance engine 543 embedded and integrated in the tax services partner application 536, according to various embodiments of the present disclosure, which is an improvement in automated computerized systems.

Displayed on the UI 900 is an interactive UI element 902 for the merchant 596 to enter one or more selected tax jurisdictions for the OSP 598 to determine whether tax nexus exists in those tax jurisdictions for the merchant 596, according to the workflow used by embedded OSP SaaS tax compliance functionality 540 of FIG. 5. In the example shown in FIG. 9, the merchant 596 has entered or otherwise selected to add California as a selected tax jurisdiction. For example, this may occur after the account creation or provisioning process referenced herein with respect to FIG. 7 and FIG. 8. Referring also to FIG. 5, adding tax jurisdictions enables the merchant's web site or mobile application hosted by the tax services integration partner 593, via the embedded OSP SaaS tax compliance functionality 540, to calculate taxes on sales made by the merchant 596 within the selected jurisdiction(s). The embedded OSP SaaS tax compliance functionality 540 may also record, via the OSP 598, completed transactions in these selected jurisdictions for remittance, depending on the merchant's integration configuration details for the embedded OSP SaaS tax compliance functionality 540.

Figure 10:
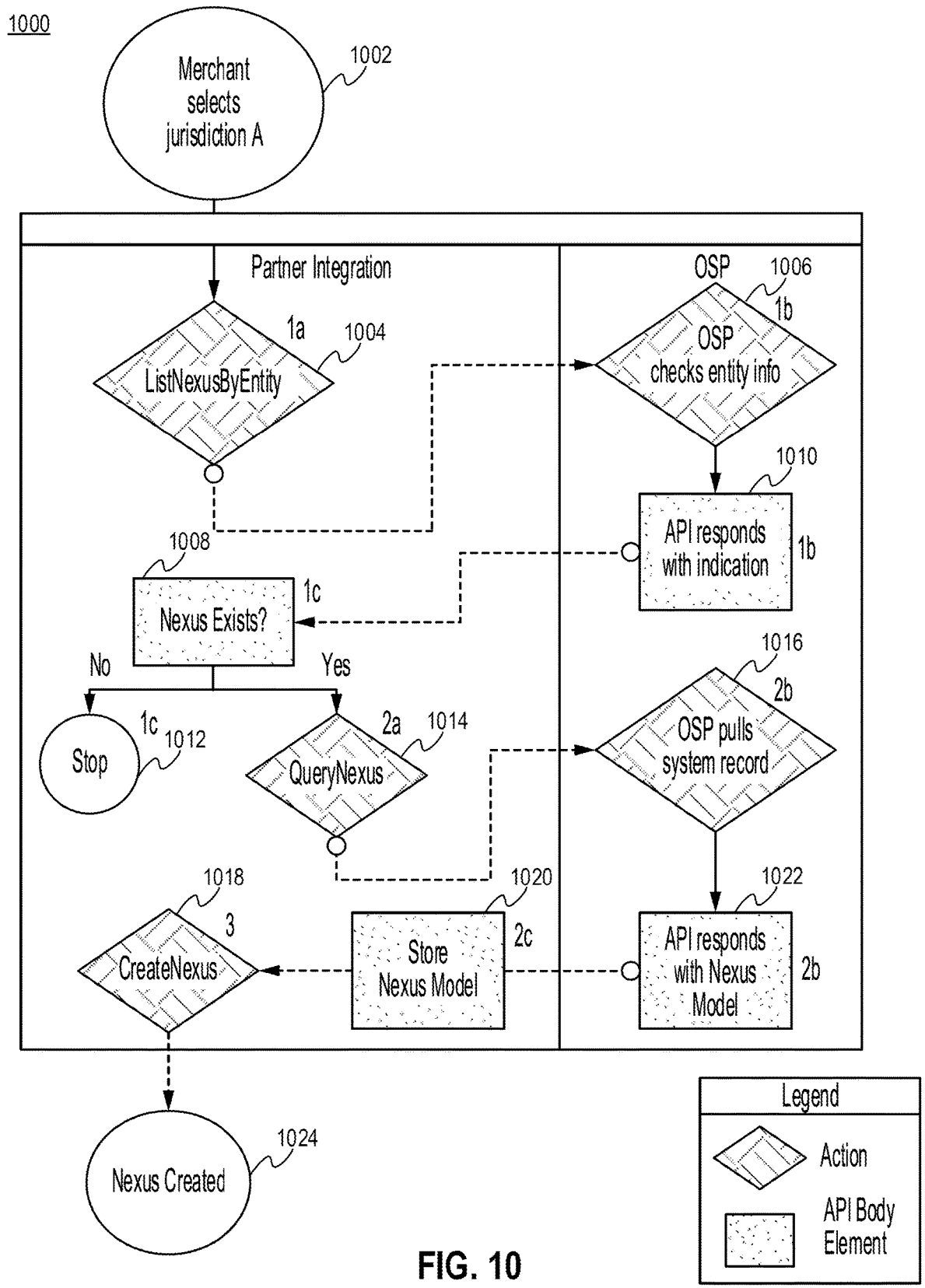
FIG. 10 is a diagram example API workflow associated with a selected API framework for enabling tax nexus determination for the tax jurisdiction(s) selected by the merchant via the UI of FIG. 9 and that defines a specific set of requests and responses with the SaaS provided by the OSP that the application of the integration partner implements to provide the tax nexus determination functionality according to various embodiments of the present disclosure, which is an improvement in automated computerized systems.

FIG. 10 is a diagram example API workflow 1000 associated with a selected API framework for enabling tax nexus determination for the tax jurisdiction(s) selected by the merchant via the UI of FIG. 9, and that defines a specific set of requests and responses with the SaaS provided by the OSP 598 that the tax services partner application 536 of the tax services integration partner 593 implements to provide the tax nexus determination functionality, according to various embodiments of the present disclosure, which is an improvement in automated computerized systems.

At starting point 1002, and referring also to FIG. 5, the merchant 596 selects a tax jurisdiction (e.g., "jurisdiction A") for the OSP 598 to determine whether tax nexus exists in that tax jurisdictions for the merchant 596. The embedded OSP SaaS tax compliance functionality 540 then performs action 1004 to send a request to the OSP 598 for an indication of whether the particular merchant or entity associated with the merchant has a nexus with the particular tax jurisdiction selected by the merchant 596. This may be used for purposes of determining respective sales tax for an individual transaction or group of transactions between the merchant and different entities. The request received by the OSP 598 causes the OSP 598 to perform action 1006 to check entity information of the associated entity and/or merchant 596 and forward an indication of whether nexus exists for the merchant 596 or the particular entity associated with the merchant 596 in the selected tax jurisdiction to API body element 1110 of the OSP 598.

The API body element 1010 then sends a response to API body element 1008 of the embedded OSP SaaS tax compliance functionality 540 including the indication of whether the merchant 596 or the particular entity associated with the merchant 596 already has a nexus that exists in the particular tax jurisdiction selected by the merchant 596. If the merchant 596 or the particular entity associated with the merchant 596 already has a nexus that exists in the particular tax jurisdiction selected by the merchant 596, then the process stops at point 1012. Otherwise, the embedded OSP SaaS tax compliance functionality 540 performs action 1014 to request a nexus model for the tax services partner application 536 to store and apply to the merchant 596 or particular entity going forward to determine whether the merchant 596 or the particular entity associated with the merchant 596 has a nexus in the particular tax jurisdiction selected by the merchant 596.

In response to receiving such a request, the OSP 598 performs action 1016 to pull a system record of the OSP 598 associated with the requested nexus model and forward it to API body element 1022 of the OSP 598. The API body element 1022 of the OSP 598 then send s the nexus model API body element 1020 of the embedded OSP SaaS tax compliance functionality 540, which stores the nexus model for the tax services partner application 536 to apply to the merchant 596 or particular entity going forward to determine whether the merchant 596 or the particular entity associated with the merchant 596 has a nexus in the particular tax jurisdiction selected by the merchant 596.

The embedded OSP SaaS tax compliance functionality 540 then performs action 1018 to create the tax nexus when it is determined, based on using the stored nexus model, that the merchant 596 or the particular entity associated with the merchant 596 has a nexus in the particular tax jurisdiction selected by the merchant 596. This results at point 1024 in a state in which the applicable nexus has been created. API endpoint bodies and request/response chains may be utilized to embed, configure and integrate the OSP SaaS tax compliance functionality 540 in the tax services partner application 536 of FIG. 5.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C #, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, including:
   at least one processor; and
   a memory coupled to the at least one processor, the memory storing instructions that, when executed by the at least one processor, cause the system to perform operations including:
   electronically receiving a selection of a workflow framework of a plurality of workflow frameworks, each workflow framework of the plurality of workflow frameworks including a configuration to embed software-as-a-service (SaaS) functionality provided by an online software platform (OSP) into an application that uses the SaaS functionality, in which the OSP electronically provides services, wherein the services include determining an amount of respective resources for individual instances; and
   in response to receiving the selection, causing a remote system that hosts the application to implement the selected workflow framework by at least transmitting a software package to the remote system, in which the software package exposes a set of pre-defined integration points with the SaaS provided by the OSP to provision the steps in one or more of the workflows of the selected workflow framework or defines a specific set of requests and responses with the SaaS functionality provided by the OSP that the application implements in order to begin the one or more workflows in the selected workflow framework and respond to the steps in the one or more workflows, in which the software package, when implemented by the remote system, automates integration and embedding of the SaaS functionality provided by the OSP into the application by at least causing the remote system to perform:
      initial configuration to capture authentication and authorization credentials, location of related services, and activation of features of the SaaS functionality provided by the OSP;
      runtime behavior for core embedding and integration into the application of the SaaS functionality provided by the OSP for determining amounts of respective resources for individual instances; and
      uninstall behavior for an application user to remove the embedding and integration into the application of the SaaS functionality provided by the OSP.

2. The system of claim 1 in which the software package includes a script which, when executed by the remote system, automates integration and embedding of the SaaS functionality provided by the OSP into the application using the set of pre-defined integration points with the SaaS or the specific set of requests and responses with the SaaS provided by the OSP.

3. The system of claim 1 in which the software package includes an executable binary file which, when executed by the remote system, automates integration and embedding of the SaaS functionality provided by the OSP into the application using the set of pre-defined integration points with the SaaS or the specific set of requests and responses with the SaaS provided by the OSP.

4. The system of claim 1 in which the software package includes an application plug-in which, when installed in the application, automates integration and embedding of the SaaS functionality provided by the OSP into the application using the set of pre-defined integration points with the SaaS or the specific set of requests and responses with the SaaS provided by the OSP.

5. The system of claim 1 in which the one or more workflows specifies:
   an order in which to call functions of the application and to call the SaaS functionality provided by the OSP for determining respective amounts of resources for individual instances;
   how data should flow between steps in the one or more workflows; and
   how the one or more workflows should progress based on results of each step in the one or more workflows.

6. The system of claim 1 in which the operations further include generating the plurality of workflow frameworks.

7. A system, including:
   at least one processor; and a memory coupled to the at least one processor, the memory storing instructions that, when executed by the at least one processor, cause the system to perform operations including:

electronically receiving a selection of a workflow framework of a plurality of workflow frameworks, each workflow framework of the plurality of workflow frameworks including a configuration to embed software-as-a-service (SaaS) functionality provided by an online software platform (OSP) into an application that uses the SaaS functionality, in which the OSP electronically provides services, wherein the services include determining an amount of respective resources for individual instances; and in response to receiving the selection, causing a remote system that hosts the application to implement the selected workflow framework by at least transmitting a software package to the remote system, in which the software package exposes a set of pre-defined integration points with the SaaS provided by the OSP to provision the steps in one or more of the workflows of the selected workflow framework or defines a specific set of requests and responses with the SaaS functionality provided by the OSP that the application implements in order to begin the one or more workflows in the selected workflow framework and respond to the steps in the one or more workflows, in which the application is provided by an integration partner of the OSP and a specific workflow of the selected workflow framework defines a specific set of requests and responses in a particular sequence with the SaaS, the specific set of requests and responses with the SaaS including, according to the particular sequence:

a first request from the application to the OSP for a new account with the OSP, the first request including user information;

a first response to the first request, the first response including account identification and a license key;

a second request from the application to the OSP, the second request including information indicating an entity associated with the user determined to be authenticated by application; and a second response from the OSP to the second request, the second response including information indicating an authenticated entity code value to be stored by the application.

8. The system of claim 7 in which the specific set of requests and responses with the SaaS further includes, according to the particular sequence:

after the second response from the OSP to the second request, a third request from the application, the third request being a request for an indication of whether the particular entity associated with the user has a nexus with a particular domain selected by the user used for purposes of determining amounts of respective resources for individual instances;

a third response from the OSP to the third request, the third response including an indication of whether the particular entity associated with the user already has a nexus that exists with the particular domain selected by the user; and a fourth request from the application, the fourth request being a request for a nexus model for the application to store and apply to the particular entity going forward to determine whether the particular entity associated with the user has a nexus with the particular domain selected by the user.

* * * * *